US010897342B2

(12) United States Patent
Fukumoto

(10) Patent No.: US 10,897,342 B2
(45) Date of Patent: Jan. 19, 2021

(54) SINGLE-LINE SERIAL DATA TRANSMISSION CIRCUIT AND SINGLE-LINE SERIAL DATA TRANSMISSION METHOD

(71) Applicant: Rohm Co., Ltd., Kyoto (JP)

(72) Inventor: Yosuke Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/491,210

(22) PCT Filed: Feb. 23, 2018

(86) PCT No.: PCT/JP2018/006604
§ 371 (c)(1),
(2) Date: Sep. 5, 2019

(87) PCT Pub. No.: WO2018/173623
PCT Pub. Date: Sep. 27, 2018

(65) Prior Publication Data
US 2020/0036504 A1 Jan. 30, 2020

(30) Foreign Application Priority Data
Mar. 22, 2017 (JP) .................. 2017-056235

(51) Int. Cl.
*H04L 7/00* (2006.01)
*H04J 3/06* (2006.01)
(Continued)

(52) U.S. Cl.
CPC .............. *H04L 7/0008* (2013.01); *G06F 1/12* (2013.01); *H04J 3/0667* (2013.01); *H04L 7/0037* (2013.01); *H04L 7/033* (2013.01)

(58) Field of Classification Search
CPC ..... H04L 7/0008; H04L 7/0037; H04L 7/033; G06F 1/12; H04J 3/0667
(Continued)

(56) References Cited

U.S. PATENT DOCUMENTS 5,600,634 A * 2/1997 Satoh ..................... H04L 12/403
370/294
5,963,064 A * 10/1999 Toyota ..................... G05F 1/561
327/103
(Continued)

FOREIGN PATENT DOCUMENTS

JP        S55-147054 A    11/1980
JP        2002-335234 A   11/2002
(Continued)

OTHER PUBLICATIONS

Japan Patent Office, International Search Report for PCT/JP2018/006604 dated May 22, 2018 (with English translation).

*Primary Examiner* — Helene E Tayong
(74) *Attorney, Agent, or Firm* — Fish & Richardson P.C.

(57) ABSTRACT

A single-line serial data transmission circuit having a master circuit 1 and a slave circuit 4, the master circuit 1 having a data clock adder 2 for writes and a data receiver 3 for reads. The slave circuit 4 has an active generator 5, a data clock separator 6 for writes, and a data transmitter 7 for reads. The master circuit 1 and the slave circuit 4 are connected by one length of a signal line 8. When the master circuit 1 writes data to the slave circuit 4, a signal synthesized from a clock signal and a data signal is transmitted to the slave circuit 4 via the signal line 8 by the master circuit 1, and the clock signal and the data signal are extracted from the transmitted signal in the slave circuit 4 through the data clock separator 6.

21 Claims, 10 Drawing Sheets

(51) Int. Cl.
*G06F 1/12* (2006.01)
*H04L 7/033* (2006.01)

(58) Field of Classification Search
USPC .......................................................... 375/355
See application file for complete search history.

(56) References Cited

U.S. PATENT DOCUMENTS

| | | | |
|---|---|---|---|
| 2002/0083232 A1* | 6/2002 | Dute | G05B 19/0423 |
| | | | 710/31 |
| 2004/0080885 A1* | 4/2004 | Gaksch | H03K 17/18 |
| | | | 361/62 |
| 2016/0028311 A1 | 1/2016 | Murakami | |

FOREIGN PATENT DOCUMENTS

| | | |
|---|---|---|
| JP | 2003-163653 A | 6/2003 |
| JP | 2003-273942 A | 9/2003 |
| JP | 2010-114636 A | 5/2010 |
| JP | 2011-010450 A | 1/2011 |
| JP | 2016-032322 A | 3/2016 |

\* cited by examiner

SINGLE-LINE SERIAL DATA TRANSMISSION CIRCUIT AND SINGLE-LINE SERIAL DATA TRANSMISSION METHOD

TECHNICAL FIELD

The present invention relates to a single-line serial data transmission circuit which transmits serial data across a single transmission line, and also relates to a single-line serial data transmission method using such a single-line serial data transmission circuit.

BACKGROUND ART

In recent years, there has been increasing demand for smaller, more versatile, and higher-performance semiconductor integrated circuit device. For example, in interface circuits for controlling digital signals that are implemented in power supply ICs etc., a switch from a parallel interface circuit to a serial interface circuit has been achieving reduction in the number of pins.

For example, serial data transmission is used to switch output voltages in a power supply circuit.

However, conventional serial interface circuits are at present mostly of a three-line or two-line type, and those of a single-line type are still not very common.

Well-known common single-line asynchronous serial interfaces perform transmission and reception across a single line. Despite requiring only one signal line, they conveniently permit a plurality of slave devices to be connected over a bus. They can also feed power via a single bus.

Patent Document 1 discloses a single-line serial data transmission method and a transmission interface circuit. In this transmission method, the transmitting side mixes data and a clock signal and transmits them together. The receiving side extracts clock timing and reconstructs the transmission-side data bit string. In transmission, the transmitting side alternately transmits a H-level chip selection signal with a long duration, followed by one clock signal of a zero-return type, followed by bit-by-bit data comprising the first to the last bit of transmission data in this order. When the receiving side receives the chip selection signal, the clock timing is extracted from the following data, and then, with write timing which is a predetermined time delayed from the clock timing, transmission data is written bit by bit to a buffer memory.

Patent Document 2 discloses a single-line serial data transmission method. In a communication system in which data generated in a slave part asynchronously from the operation of a master part is serially transmitted to the master part, a data transmission request from the slave part is asynchronously transmitted to the master part. The master part then transmits to the slave part a clock signal for synchronized communication based on the transmission request, and the slave part transmits to the master part the above-mentioned data in synchronism with the clock signal.

Patent Document 3 discloses a single-line serial data transmission method. In a serial communication method in which the transmitting and receiving sides are connected together across a single line and data is transmitted sequentially bit by bit, a synchronizing trigger for synchronizing the transmitting and receiving sides is transmitted. Between this synchronizing trigger and the subsequent synchronizing trigger, data of a predetermined number n (>1) of bits is transmitted. This makes it possible to achieve a serial communication method which, while preventing loss of synchronism by inserting synchronizing triggers, can prevent a drop in the transfer rate.

LIST OF CITATIONS

Patent Literature

Patent Document 1: JP-A-2002-335234
Patent Document 2: JP-A-2003-163653
Patent Document 3: JP-A-2003-273942

Non-Patent Literature

SUMMARY OF THE INVENTION

Problem to be Solved by the Invention

However, since the common single-line serial interfaces described above allow connection of a plurality of devices, they require complicated control methods. In addition, incorporation of a large capacitor is required to support a power supply circuit, and this may increase the size of the circuit area.

The single-line serial data transmission method and the transmission circuit according to Patent Document 1 allow transmission of a clock and data from the slave side, and this may increase the size of the circuit area.

The single-line serial data transmission method according to Patent Document 2 allows connection of a plurality of slaves, and this increases the size of the circuit area. Furthermore, a start bit and a stop bit are used only for identifying plurality of slaves and at the start of communication from the slave to the master, and thus the purpose of the use of the start bit and the stop bit is different from that in the present invention.

In the single-line serial data transmission method according to Patent Document 3, a clock is required in both the master and the slave, and this may increase the size of the circuit area. Furthermore, when there is a large error between the respective clock frequencies, high-speed data transmission may not be possible.

The present invention is made with consideration given to the above problems, and is aimed at providing a single-line serial data transmission circuit with a simpler circuit design and a simpler transmission method than in conventional single-line serial data transmission circuits.

According to one aspect of the present invention, a single-line serial transmission circuit has a master circuit and a slave circuit. The master circuit includes a data clock adder used in writing transmission data from the master circuit to the slave circuit and a data receiver used in writing reception data from the slave circuit to the master circuit. The slave circuit includes a data clock separator used in writing the transmission data from the master circuit to the slave circuit, a data transmitter used in writing the reception data from the slave circuit to the master circuit, and an active generator. The master circuit and the slave circuit are connected together via a single signal line.

According to another aspect of the present invention, in the single-line serial transmission circuit, during a write of the transmission data from the master circuit to the slave circuit, in the master circuit, a synthetic signal synthesized from a clock signal and a data signal by the data clock adder is transmitted to the slave circuit via the signal line. In the slave circuit, the synthetic signal transmitted via the signal line is passed through the data clock separator, and is then passed through a delay circuit to extract the clock signal and through the data clock separator to extract the data signal.

According to another aspect of the present invention, in the single-line serial transmission circuit, during a write of the reception data from the slave circuit to the master circuit, a logic out signal from a logic in the slave circuit is passed through a delay circuit and the data transmitter and is transmitted via the signal line to the master circuit. In the master circuit, transmission data transmitted from the signal line is passed through the data receiver to extract a read data signal.

According to another aspect of the present invention, in the single-line serial transmission circuit, the slave circuit includes a signal terminal via which a synthetic signal synthesized from a clock signal and a data signal by the data clock adder is received, a control terminal via which the slave circuit is brought into a data accepting state, a slave clock terminal, and a slave data terminal. An input to the signal terminal is fed as the data signal to the slave data terminal. The clock signal generated from the input to the signal terminal is fed to the slave clock terminal. A control signal generated from the input to the signal terminal is fed to the control terminal.

According to another aspect of the present invention, in the single-line serial transmission circuit, in the slave circuit, the input to the signal terminal is fed as the data signal to the slave data terminal. The clock signal generated from the input to the signal terminal via a D flip-flop is fed to the slave clock terminal. The control signal generated from the input to the signal terminal via a delay circuit and the D flip-flop is fed to the control terminal.

According to another aspect of the present invention, in the slave circuit, the input to the signal terminal is fed as the data signal to the slave data terminal. The clock signal generated from the input to the signal terminal via the D flip-flop is fed to the slave clock terminal. The control signal generated from the input to the signal terminal via the delay circuit is fed to the control terminal.

According to another aspect of the present invention, in the single-line serial transmission circuit, to delay the input to the signal terminal, the delay circuit charges a capacitor with a current source and discharges a capacitor with a MOS transistor.

According to another aspect of the present invention, in the single-line serial transmission circuit, the delay circuit is composed of a charging/discharging circuit including a resistor and a capacitor, and a delay time is determined by a resistance value of the resistor and a capacitance value of the capacitor.

According to another aspect of the present invention, in the single-line serial transmission circuit, generation of the clock signal becomes possible when the control signal turns to high level, and the control signal stabilizes the control signal itself on having turned to high level or low level.

According to another aspect of the present invention, in the single-line serial transmission circuit, the slave circuit responds to the signal line upon receiving a request of a read (reading) from the master circuit to the slave circuit.

According to another aspect of the present invention, in the single-line serial transmission circuit, the slave circuit includes a switching power supply circuit.

According to another aspect of the present invention, in the single-line serial transmission circuit, the switching power supply circuit has at least one of an overcurrent protection function, an overvoltage protection function, an output ground short protection function, and a temperature protection.

According to another aspect of the present invention, in a single-line serial transmission method, communication starts at a fall of a synthetic signal synthesized from a clock signal and a data signal by the data clock adder, and when the synthetic signal stays at low level for a predetermined time, a control signal generated from the synthetic signal turns to high level to bring the slave circuit into an accepting state. A slave clock is extracted a predetermined time after the fall of the synthetic signal, and data is read at a rise of the slave clock. When the synthetic signal stays at high level for a predetermined time, the control signal turns to low level to bring the slave circuit into a non-accepting state, thereby ending communication.

According to another aspect of the present invention, in the single-line serial transmission method, the synthetic signal includes a start bit at the head, followed by a read (reading) and a write (writing), an address, data, and a stop bit at the tail.

According to another aspect of the present invention, in the single-line serial transmission method, at a start of communication, an AND of the clock signal and the data signal is transmitted as the synthetic signal from the master circuit, and when the synthetic signal stays at low level for a cycle T of the clock signal or longer, the control signal of the slave circuit turns to high level, thereby bringing the slave circuit into an accepting state.

According to another aspect of the present invention, in the single-line serial transmission method, a pulse width y2 of the clock signal is set such that y2=T/m (the cycle T divided by m; $2 \leq m \leq 50$), and other events are processed during part of a time of one cycle excluding the pulse width.

According to another aspect of the present invention, in the single-line serial transmission method, during a write (writing), an AND of the clock signal and the data signal is transmitted as the synthetic signal from the master circuit. The slave circuit drops a slave clock at a fall of the synthetic signal and then generates a signal which rises T/m (the cycle T of the clock signal divided by m) thereafter, and at a rise of the slave clock, slave data is determined.

According to another aspect of the present invention, in the single-line serial transmission method, during a read (reading), the clock signal alone is transmitted as the synthetic signal from the master circuit. The slave circuit drops a slave clock at a fall of the clock signal and then generates a signal which rises T/m (the cycle T of the clock signal divided by m) thereafter. At a rise of the slave clock, a logic out is determined. At a rise of the slave clock, a data out is determined. At a rise of a read clock in the master circuit, a signal is read.

According to another aspect of the present invention, in the single-line serial transmission method, at an end of communication, an AND of the clock signal and the data signal is transmitted as the synthetic signal from the master circuit, and when the synthetic signal stays at high level for a cycle T of the clock signal or longer, the control signal of the slave circuit turns to low level, thereby bringing the slave circuit into a non-accepting state.

According to another aspect of the present invention, a master circuit includes a data clock adder used in writing transmission data to a slave circuit and a data receiver used in writing reception data from the slave circuit. The master circuit forms a single-line serial transmission circuit by being connected with the slave circuit via a single signal line.

Advantageous Effects of the Invention

According to the invention disclosed herein, in a single-line serial transmission circuit of what is called a one-to-one configuration which is configured such that one slave circuit is provided for one master circuit, it is possible to achieve a smaller circuit scale than before.

DESCRIPTION OF EMBODIMENTS

Now, embodiments of the present invention will be described with reference to the drawings.

Figure 1:
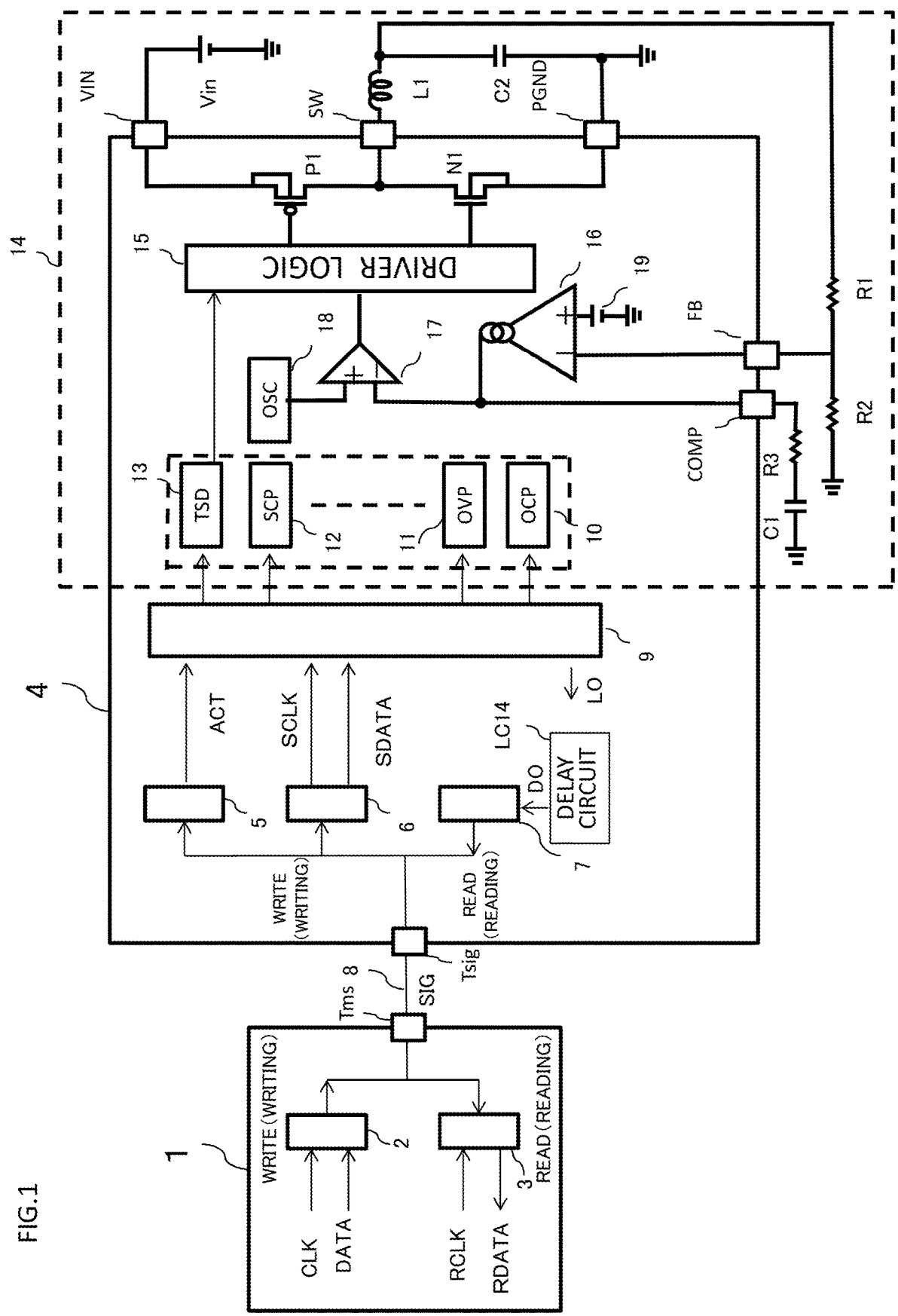
FIG. 1 A block diagram showing an outline of a single-line serial data transmission circuit of the present invention.

FIG. 1 is a block diagram showing an outline of a single-line serial data transmission circuit of the present invention. A master circuit 1 has a data clock adder 2, which adds together a clock CLK and data DATA, and a data receiver 3. A slave circuit 4 has an active generator 5, which generates a control signal ACT; a data clock separator 6, which separates a slave clock SCLK from slave data SDATA; and a data transmitter 7. The master circuit 1 and the slave circuit 4 are connected together via a signal line 8.

One example of the slave circuit 4 is a power supply circuit. An incorporated logic 9, by receiving the control signal ACT, the slave clock SCLK, and the slave data SDATA, controls at least one of the protection functions of a comparatively large number of circuits provided as protection circuits for, for example, a switching regulator 14, such as an overcurrent protection function (OCP) 10, an overvoltage protection function (OVP) 11, an output ground short protection function (SCP) 12, and a temperature protection function (TSD) 13. The overcurrent protection function 10 etc. control a driver logic 15 of the switching regulator 14 under a condition set by the logic 9.

The switching regulator 14 is provided with, in addition to the overcurrent protection function 10 etc., a driver logic 15, an error amplifier 16, a PWM comparator 17, an oscillator 18, a reference voltage source 19, a PMOS transistor P1, and an NMOS transistor N1, and has these integrated in it. In addition, the switching regulator 14 is provided with external terminals VIN, SW, PGND, FB, and COMP for establishing electrical connection with the outside. Furthermore, as external components, there are provided a power source Vin, a coil L1, a capacitor C1, a capacitor C2, a resistor R1, a resister R2, and a resister R3. Since the topology of the switching regulator 14 is a common one, it will not be discussed herein.

In a power supply circuit that employs the single-line serial transmission circuit and its transmission method shown in FIG. 1, the clock CLK and the data DATA are transmitted from the master circuit 1 to the slave circuit 4, and are received as the slave clock SCLK by the slave circuit 4 and the slave data SDATA. In the slave circuit 4, the settings of various protection functions are changed based on the received slave data SDATA.

This makes it possible, for example, to change specifications such that, for one user, the sensing threshold value of the overvoltage protection function 11 is set at 25 V and the sensing threshold value of the overcurrent protection function 10 is set at 1.5 A, and, for another user, the sensing threshold value of the overvoltage protection function 11 is set at 20 V and the sensing threshold value of the overcurrent protection function 10 is set at 1.0 A.

When communication between the master circuit 1 and the slave circuit 4 is started, an activating signal at, for example, low level L is transmitted from the master circuit 1 to the slave circuit 4 via the signal line 8. In the slave circuit 4, the activating signal is passed through the active generator 5, and thereby the control signal ACT is activated; this brings the logic 9 into a data accepting state.

In this description, a write (writing) means writing of control data from the master circuit 1 to the slave circuit 4, and a read (reading) means reading of status data from the slave circuit 4 to the master circuit 1.

During a write (writing), the clock CLK and the data DATA are, as a synthetic signal SIG synthesized by the data clock adder 2, output from the master signal terminal Tms of the master circuit 1 to the signal line 8. In the slave circuit 4, the synthetic signal SIG passes via the signal terminal Tsig through the data clock separator 6 to be separated into the slave data SDATA and the slave clock SCLK.

During a read (reading), the clock CLK alone is, as the synthetic signal SIG, transmitted from the master circuit 1 to the signal line 8. In the slave circuit 4, the clock CLK fed in via the data clock separator 6 is used as the slave clock SCLK. An output logic out LO from the logic 9 is turned into a data out DO via a delay circuit LC14, and the data out DO is output to the signal line 8 via the data transmitter 7. The master circuit 1 reads, with the data receiver 3, the data out DO from the slave circuit 4 using a read clock RCLK and uses the data out DO as read data RDATA.

When communication is finished, a deactivating signal at high level H is transmitted from the master circuit 1 to the slave circuit 4 via the signal line 8. In the slave circuit 4, the activating signal is passed through the active generator 5, and thereby the control signal ACT is deactivated; this brings the logic 9 into a non-data accepting state.

Figure 2:
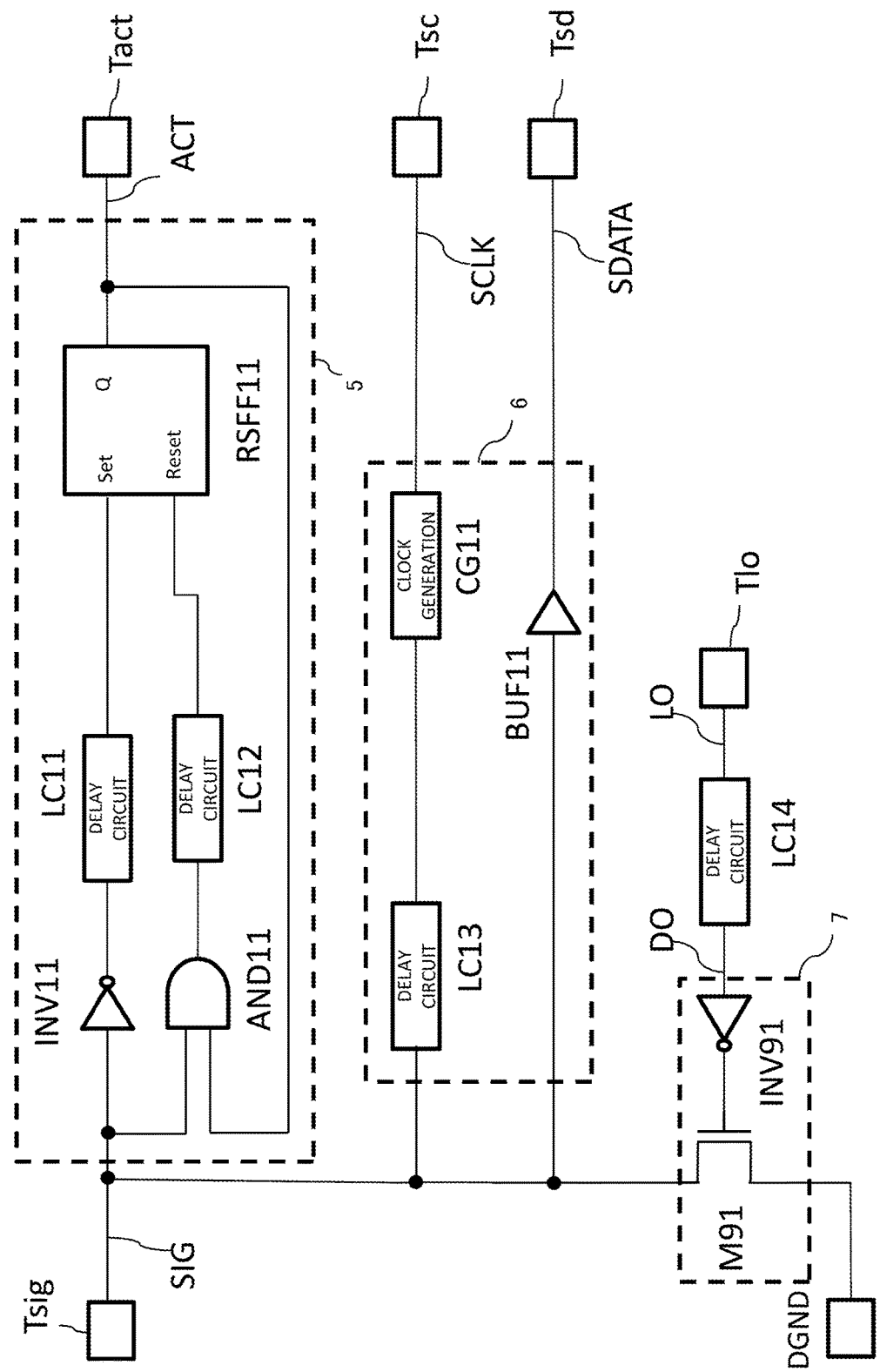
FIG. 2 A block diagram showing a configuration of part of a slave circuit 4.

FIG. 2 is a block diagram showing a specific configuration of a part (the active generator 5, the data clock separator 6, and the data transmitter 7) of the slave circuit 4.

The slave circuit 4 has a signal terminal Tsig for receiving the synthetic signal SIG, a control terminal Tact for bringing the slave circuit 4 into a data accepting state or a non-data accepting state, a slave clock terminal Tsc, a slave data terminal Tsd, and a logic out terminal Tlo.

To the slave data terminal Tsd, the output of a buffer BUF11 is connected. The input of the buffer BUF11 is connected to the signal terminal Tsig. To the slave clock terminal Tsc, the output of a clock generation circuit CG11 is connected. The input of the clock generation circuit CG11 is connected to the output of the delay circuit LC13. The input of the delay circuit 13 is connected to the signal terminal Tsig.

To the signal terminal Tsig, the input of an inverter INV11 and the first input of an AND circuit AND11 are connected. The output of the inverter INV11 is connected to the input of a delay circuit LC11. The output of the delay circuit LC11 is connected to the set terminal Set of an RS flip-flop RSFF11.

The output terminal Q of the RS flip-flop RSFF11 is connected to the control terminal Tact and to the second input of the AND circuit AND11. The output of the AND circuit AND11 is connected to the input of a delay circuit LC12. The output of the delay circuit LC12 is connected to the reset terminal Reset of the RS flip-flop RSFF11.

The logic out terminal Tlo is connected to the input of the delay circuit LC14. The output of the delay circuit LC14 is connected to the input of an inverter INV91. The output of the inverter INV91 is connected to the gate of a MOS transistor M91. The source of the MOS transistor M91 is connected to a ground potential DGND. The drain of the MOS transistor M91 is connected to the signal terminal Tsig.

In the illustrated single-line serial transmission circuit, the clock CLK and the data DATA are transmitted together via a single signal line. The synthetic signal SIG also serves as the control signal ACT. Thus, the inverter, the delay circuit, the RS flip-flop, etc. are used to separate those signals.

For example, the inverter INV11 and the delay circuit LC11 are provided to turn the control signal ACT to high level H a predetermined time after the synthetic signal SIG turns to low level L (that is, the logic level during the activated time). On the other hand, the AND circuit AND11 and the delay circuit LC12 are provided to turn the control signal ACT to low level L a predetermined time after the synthetic signal SIG turns to high level H (that is, the logic level during the deactivated period). The RS flip-flop RSFF11 is used to hold the logic level of the control signal ACT.

The delay circuit LC13 and the clock generation circuit CG11 are used to extract the clock. A read (reading) is performed using the MOS transistor M91. The inverter circuit INV91 is provided to drive the MOS transistor M91. If the polarity of the signal permits, the inverter INV91 may be replaced with a buffer. The delay circuit LC14 is used to adjust the output timing of a read (reading).

Figure 3:
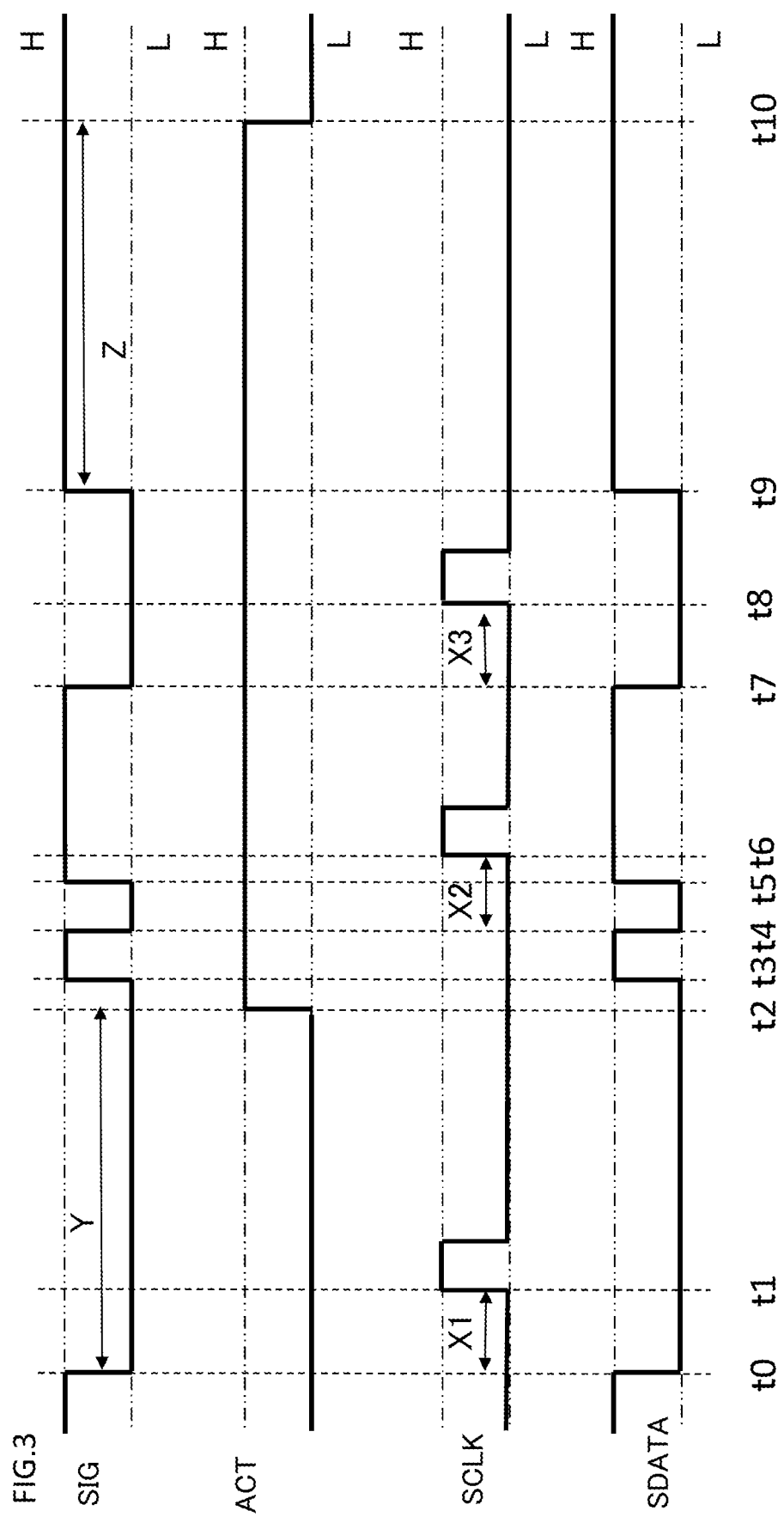
FIG. 3 A diagram showing a timing chart associated with FIG. 2.

FIG. 3 is a timing chart of different signals that appear at relevant nodes during a write (writing) in the slave circuit 4 shown in FIG. 2.

The synthetic signal SIG is fed from the master circuit 1 to the signal terminal Tsig of the slave circuit 4 via the signal line 8. The level and the behavior of the synthetic signal SIG at different time points are as described below.

At time point t0, the synthetic signal SIG turns to low level L and communication starts between the master circuit 1 and the slave circuit 4. At time point t3, the signal turns to high level H and preparation is done for generation of the slave clock SCLK. At time point t4, the signal turns to low level L and generation of the slave clock SCLK is started. At time point t5, the signal turns to high level H and preparation is done for reading of the slave data SDATA. At time point t7, the signal turns to low level L and generation of the slave clock SCLK is started. At time point t8, the signal is at low level L and preparation is done for reading of the slave data SDATA. At time point t9, the signal turns to high level H and preparation is done for ending of communication.

The control signal ACT is a signal fed (output) to the control terminal Tact and determines whether the slave circuit 4 is in a data accepting state or in a non-data accepting state. When the control signal ACT is at low level L, the slave circuit 4 does not accept the slave data SDATA.

The control signal ACT turns to high level H at time point t2 and the slave circuit 4 goes into a data accepting state. Between time points t0 and t2, a predetermined response start time Y is provided. This is to prevent a false value from being written to the slave circuit 4 due to noises or the like.

The slave clock SCLK is a signal extracted to the slave clock terminal Tsc. At time point t1, the slave clock SCLK responds, but at that time the control signal ACT is at low level and thus the slave circuit 4 does not operate as such. The response wait time X1 before the slave clock SCLK responds will be described later.

The slave clock SCLK appears at time point t6, which is a response wait time X2 later than the fall of the synthetic signal SIG. The setting of the response wait time X2 is very important in reading the slave data SDATA. In a single-line serial data transmission method according to the present invention, the clock CLK and the data DATA are mixed and transmitted together as the synthetic signal SIG. Thus, how far behind the clock CLK to place the data DATA needs to be determined in advance so as to be able to determine at what timing to read the slave data SDATA.

The slave data SDATA is at high level H or at low level L with the same timing as the synthetic signal SIG, and is read when the slave clock SCLK rises. At time point t1, the slave clock SCLK responds, but at that time the control signal ACT is at low level and thus the slave circuit 4 does not operate as such.

The slave data SDATA is at high level H at time point t6, and thus, in this example, high level H is read as the slave data SDATA.

The slave data SDATA is at low level L a response wait time X3 after time point t7, that is, at time point t8, and thus, in this example, low level L is read as the slave data SDATA. The response wait times X1, X2, and X3 are set at the same value in the embodiment of the present invention.

At time point t9, the synthetic signal SIG turns to high level H. Then, when the period of a given response end time Z has passed, that is, at time point t10, the control signal ACT turns to low level L. The slave circuit 4 goes into a non-data accepting state and communication ends.

Figure 4:
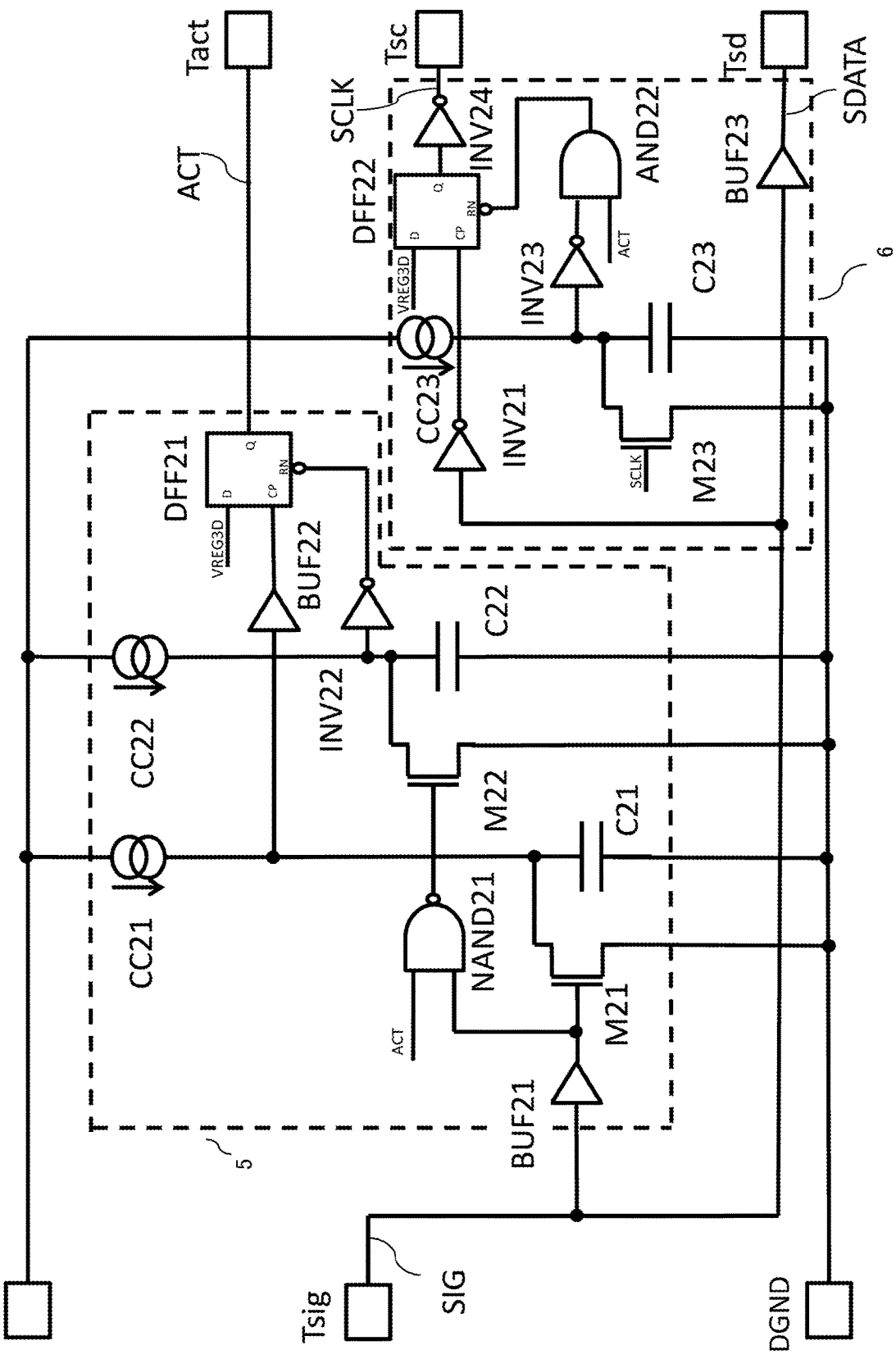
FIG. 4 A circuit diagram showing one specific example of the part of the configuration shown in FIG. 2.

FIG. 4 is an example, as presented in a specific circuit diagram, of the active generator 5 and data clock separator 6 shown in the block diagram in FIG. 2. The single-line serial transmission circuit having the active generator 5 and the data clock separator 6 shown in FIG. 4 includes a signal terminal Tsig for receiving the synthetic signal SIG, a control terminal Tact for bringing the slave circuit 4 into a data accepting state or a non-accepting state, a slave clock terminal Tsc, and a slave data terminal Tsd.

To the signal terminal Tsig, the input of an inverter INV21, the input of a buffer BUF21, and the input of a buffer BUF23 are connected, and the output of the buffer BUF23 is connected to the slave data terminal Tsd. The buffer BUF23 is used to pass the synthetic signal SIG as the slave data SDATA to the succeeding stage.

The output of the inverter INV21 is connected to the CP input of a D flip-flop DFF22. To the D input of the D flip-flop DF22, a supply power potential VREG3D is connected. The inverter INV21 is used to drive the D flip-flop DFF22 at the fall of the signal.

To the RN input of the D flip-flop DFF22, the output of an AND circuit AND22 is connected. To the output of the D flip-flop DFF22, the input of an inverter INV24 is connected. The D flip-flop DFF22 is used to extract the slave clock SCLK. The output of the inverter INV24 is connected to the slave clock terminal Tsc. The inverter INV24 is used to adjust the polarities and the delay time of the slave clock SCLK and also as a buffer which connects the D flip-flop DFF22 to the slave clock terminal Tsc.

The output of the buffer BUF21 is connected to the second input of a NAND circuit NAND21 and to the gate of a MOS transistor M21, and the source of the MOS transistor M21 is connected to the ground potential DGND. The buffer BUF21 is used to drive the MOS transistor M21.

The drain of the MOS transistor M21 is connected to one end of a capacitor C21, to the input of a buffer BUF22, and to one end of a current source CC21, and the other end of the capacitor C21 is connected to the ground potential DGND.

The other end of the current source CC21 is connected to the supply power potential VREG3D. The output of the buffer BUF22 is connected to the CP input of a D flip-flop DFF21. To the D input of the D flip-flop DFF21, the supply power potential VREG3D is connected. The buffer BUF22 is used to shape the waveform of a triangular-wave signal generated by the current source CC21 and the capacitor C21.

To the RN input of the D flip-flop DFF21, the output of an inverter INV22 is connected, and the output of the D flip-flop DFF21 is connected to the control terminal Tact. The D flip-flop DFF21 is used to hold the control signal ACT.

The first input of the NAND circuit NAND21 is connected to the control terminal Tact, and the output of the NAND circuit NAND21 is connected to the gate of a MOS transistor M22. The source of the MOS transistor M22 is connected to the ground potential DGND, and the drain of the MOS transistor M22 is connected to one end of a capacitor C22, to the input of the inverter INV22, and to one end of a current source CC22. The NAND circuit NAND21 is controlled by the control signal ACT and is used to drive the MOS transistor M22. The inverter INV22 is used to shape the waveform of a triangular-wave signal generated by the current source CC22 and the capacitor C22.

The other end of the capacitor C22 is connected to the a ground potential DGND, and the other end of the current source CC22 is connected to the supply power potential VREG3D.

The slave clock terminal Tsc is connected to the gate of a MOS transistor M23, and the source of the MOS transistor M23 is connected to the ground potential DGND. The drain of the MOS transistor M23 is connected to one end of a capacitor C23, to the input of an inverter INV23, and to one end of the current source CC23. The other end of the capacitor C23 is connected to the ground potential DGND, and the other end of the current source CC23 is connected to the supply power potential VREG3D.

The output of the inverter INV23 is connected to the first input of the AND circuit AND22. The control terminal Tact is connected to the second input of the AND circuit AND22. The inverter INV23 is used to shape the waveform of a triangular-wave signal generated by the current source CC23 and the capacitor C23. The AND circuit AND22 is controlled by the control signal ACT and is used to generate the slave clock SCLK.

The response start time Y shown in FIG. 3 is determined by the current value of the current source CC21 and the capacitance value of the capacitor C21. The response end time Z in FIG. 3 is determined by the current value of the current source CC22 and the capacitance value of the capacitor C22. The response wait time X shown in FIG. 3 is determined by the current value of the current source CC23 and the capacitance value of the capacitor C23.

Figure 5:
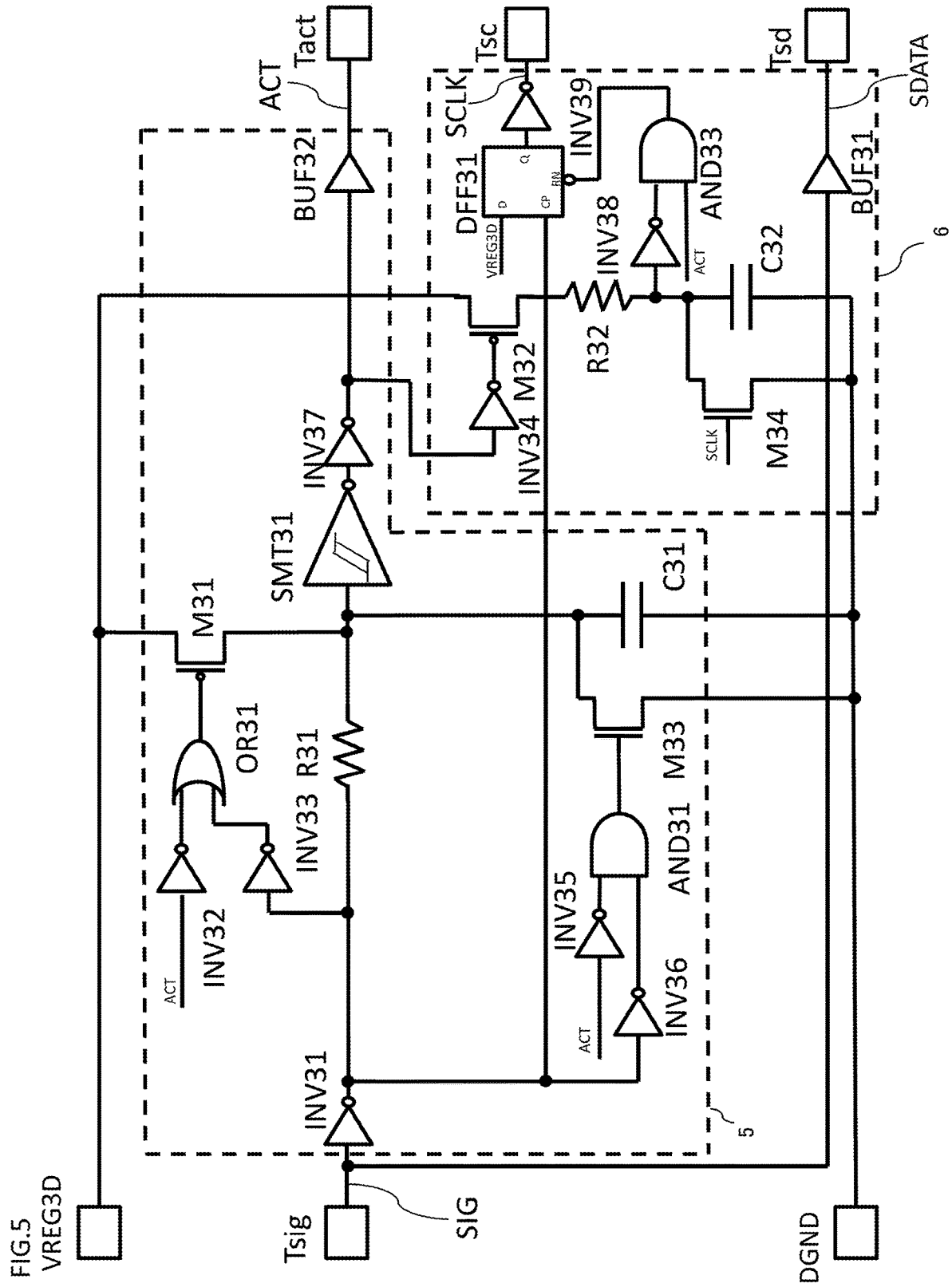
FIG. 5 A circuit diagram showing another specific example of the part of the configuration shown in FIG. 2.

FIG. 5 is a circuit diagram showing another specific example of the part of the configuration shown in FIG. 2. A major difference from FIG. 4 is that less capacitors are used as a result of a delay circuit used in the active generator 5 being shared. By the shared delay circuit, the response start times Y and Z in FIG. 3 are generated.

The active generator 5 and the data clock separator 6 shown in FIG. 5 include a signal terminal Tsig for receiving the synthetic signal SIG, a control terminal Tact for turning the slave circuit 4 data to a data accepting state, a slave clock terminal Tsc, and a slave data terminal Tsd.

To the signal terminal Tsig, the input of an inverter INV31 and the input of a buffer BUF31 are connected, and the output of the buffer BUF31 is connected to the slave data terminal Tsd. The buffer BUF31 is used to pass the synthetic signal SIG as slave data SDATA to the succeeding stage.

The output of the inverter INV31 is connected to one end of a resistor R31, to the input of an inverter INV33, to the input of an inverter INV36, and to the CP input of the D flip-flop DFF31. To the D input of the D flip-flop DFF31, the supply power potential VREG3D is connected. The inverter INV31 is used to drive the resistor R31.

To the RN input of the D flip-flop DFF31, the output of the AND circuit AND33 is connected. To the output of the D flip-flop DFF31, the input of the inverter INV39 is connected. The output of the inverter INV39 is connected to the slave clock terminal Tsc. The inverter INV39 is used to adjust the polarities and the delay time of the slave clock SCLK and also as a buffer which connects the D flip-flop DFF31 to the slave clock terminal Tsc. The D flip-flop DFF31 is used to extract the slave clock SCLK.

The output of the inverter INV36 is connected to the second input of an AND circuit AND31. The input of an inverter INV35 is connected to the control terminal Tact. The output of the inverter INV35 is connected to the first input of the AND circuit AND31. The output of the AND circuit AND31 is connected to the gate of a MOS transistor M33. The inverters INV35 and INV36 are used to adjust the polarities of the control signal ACT and the synthetic signal SIG, respectively, which are fed to the AND circuit AND31.

The AND circuit AND31 is controlled by the control signal ACT and is used to drive the MOS transistor M33.

The output of the inverter INV33 is connected to the second input of an OR circuit OR31. The input of an inverter INV32 is connected to the control terminal Tact. The output of the inverter INV32 is connected to the first input of the OR circuit OR31. The output of the OR circuit OR31 is connected to the gate of a MOS transistor M31. The inverters INV32 and INV33 are used to adjust the polarities of the control signal ACT and the synthetic signal SIG, respectively, which are fed to the OR circuit OR31.

The OR circuit OR31 is controlled by the control signal ACT and is used to drive the MOS transistor M31.

The source of the MOS transistor M31 is connected to the supply power potential VREG3D. The drain of the MOS transistor M31 is connected to the other end of a resistor R31, to one end of a capacitor C31, to the drain of a MOS transistor M33, and to the input of a Schmitt inverter SMT31. The output of the Schmitt inverter SMT31 is connected to the input of an inverter INV37. The Schmitt inverter SMT31 is used to shape the waveform of a triangular-wave signal generated by the resistor 31 and the capacitor C31.

The source of the MOS transistor M33 is connected to the ground potential DGND. The other end of the capacitor C31 is connected to the ground potential DGND. The source of a MOS transistor M34 is connected to the ground potential DGND. One end of a capacitor C32 is connected to the ground potential DGND.

The drain of the MOS transistor M34 is connected to the other end of the capacitor C32, to the input of an inverter INV38, and to one end of a resistor R32. The slave clock terminal Tsc is connected to the gate of the MOS transistor M34. The other end of the resistor R32 is connected to the drain of a MOS transistor M32. The source of the MOS transistor M32 is connected to the supply power potential VREG3D.

The output of the inverter INV38 is connected to the first input of the AND circuit AND33. The control terminal Tact is connected to the second input of the AND circuit AND33. The inverter INV38 is used to shape the waveform of a triangular-wave signal generated by the resistor R32 and the capacitor C32. The AND circuit AND33 is controlled by the control signal ACT and is used to generate the slave clock SCLK.

The output of the inverter INV37 is connected to the input of a buffer BUF32 and to the input of an inverter INV34. The output of the inverter INV34 is connected to the gate of the MOS transistor M32. The output of the buffer BUF32 is connected to the control terminal Tact. The inverter INV37 is used to adjust polarities. The inverter INV34 is used to drive the MOS transistor M32. The buffer BUF32 is used to drive the control signal ACT.

Figure 6:
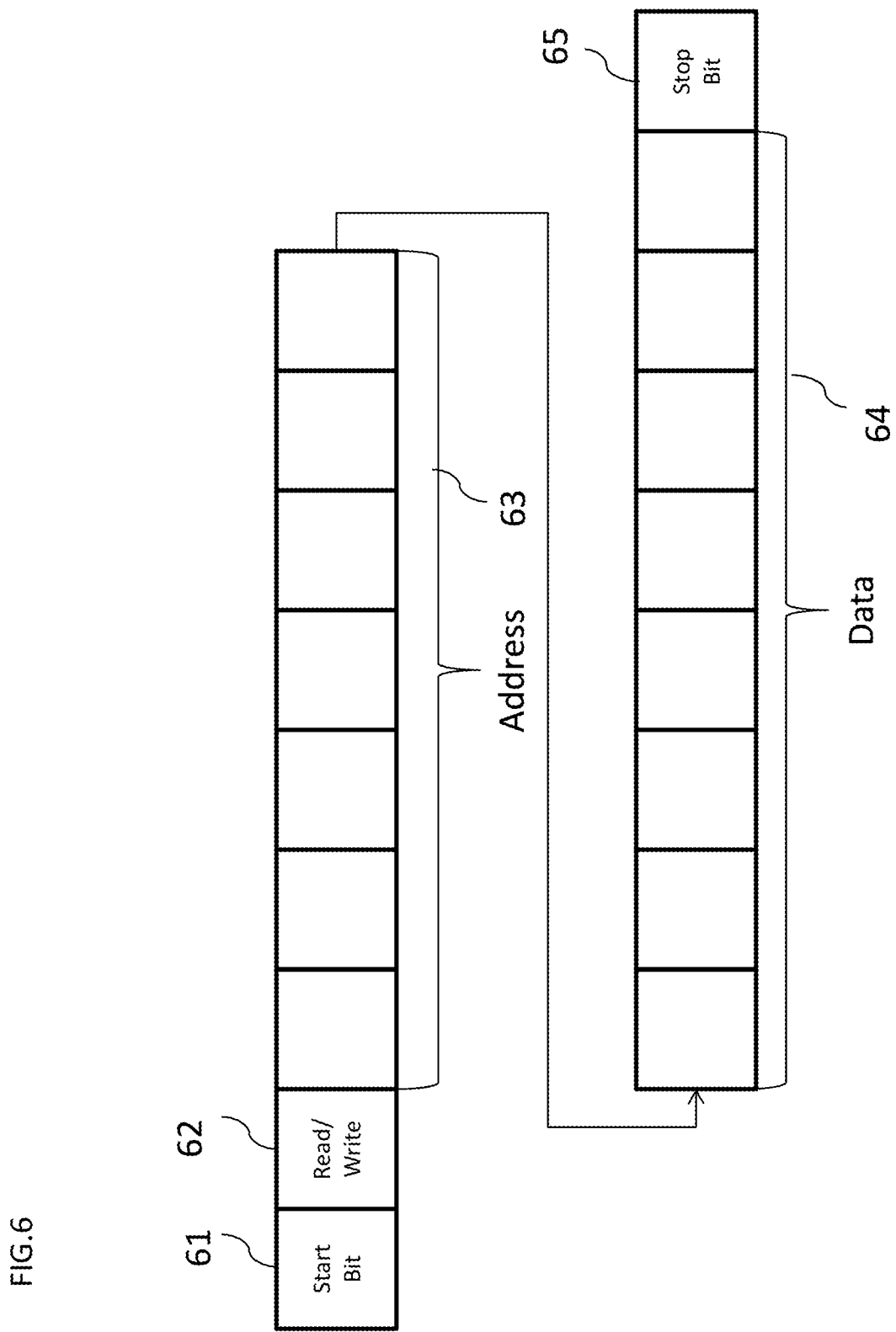
FIG. 6 A diagram showing an example of data configuration adopted in a single-line serial data transmission method of the present invention.

FIG. 6 shows an example of data configuration adopted in the serial data transmission method of the present invention. Data used in the present invention is composed of a start bit 61 at the head, the subsequent one bit for read/write judgement 62, the subsequent seven bits for specifying an address 63, the subsequent eight bits for transmitting or receiving data 64, and a stop bit 65 at the tail. A possible usage is, for example, to specify the storage destination of the sensing threshold value of the overvoltage protection function 11 in the address 63 and to set the sensing threshold value in the data 64.

For the slave circuit 4 to be able to receive a command, it needs to receive the start bit 61 from the master circuit 1.

Figure 7:
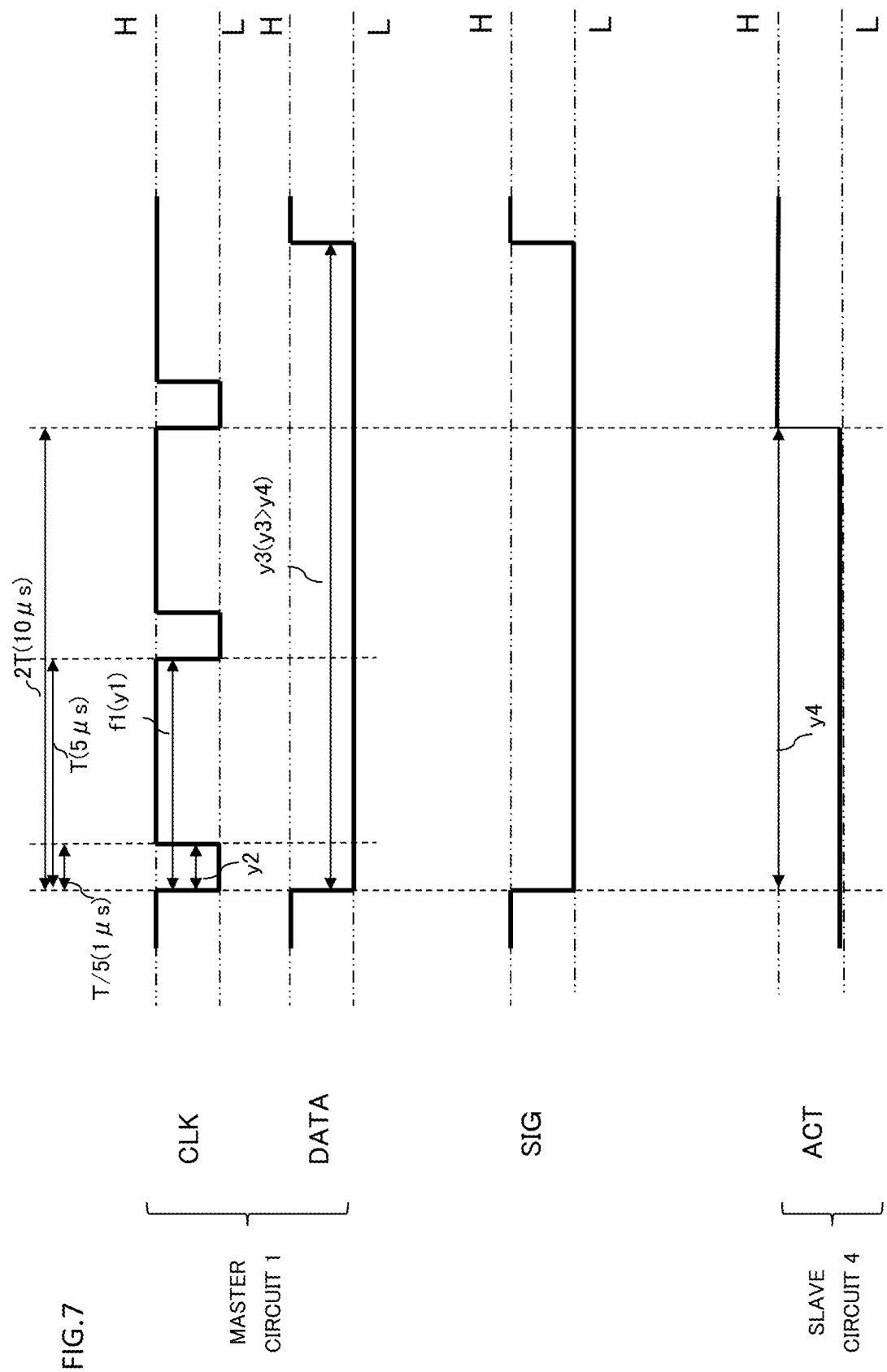
FIG. 7 A diagram showing a start bit signal used in the single-line serial data transmission method of the present invention.

FIG. 7 shows different signals which appear at relevant nodes in the master circuit 1 and the slave circuit 4 shown in FIG. 1. They will be described below with reference to FIGS. 1 to 6.

In this example, the transmission frequency f1 ranges, for example, approximately from 100 kHz to 2 MHz. The frequency can be changed through the adjustment of the resistor R31, the capacitor C31, the resistor R32, and the capacitor C32 shown in FIG. 5 (in FIG. 4, the constant current sources and the capacitors), through the adjustment of the delay time of the delay circuit LC14 in FIG. 2, and through the setting of the master circuit 1 (the changing of the settings for the read clock RCLK) according to different frequencies.

FIG. 7 shows a signal of the start bit 61. In this example, the transmission frequency f1 is, for example, 200 kHz; that is, the clock CLK is transmitted in such a way that it falls and holds low for 1 μs (the clock transmission time y2) every 5 μs (one cycle time y1).

The clock CLK transmits low level L for only one fifth (T/5) of a cycle (T).

The data DATA stays at low level L for a time equal to or longer than two cycles (2T). Here, the time is set to be equal to or longer than the cycle T for distinction from low level L in the data DATA during a write (writing), which will be described later. With manufacturing variations in ICs taken into consideration, however, it is preferable that the time be set to be two cycles or longer. Accordingly, in this example, the time is set to be two cycles or longer.

The synthetic signal SIG has the waveform of the AND of the clock CLK and the data DATA.

The control signal ACT turns to high level H when the synthetic signal SIG stays at low level L for a time equal to or longer than two cycles (2T), and this brings the slave circuit 4 into a data DATA accepting state. A response start transmission time y3 needs to be longer than a response start time y4.

In this example, two cycles (2T) equal 10 μs (the response start time y4). The subsequent one bit permits a read/write 62 judgement. It is assumed that a high level H indicates a read (reading) and that low level L indicates a write (writing). The subsequent seven bits indicate the address 63, and the subsequent eight bits indicate the data 64. The stop bit 65 at the tail marks the end of communication.

Figure 8:
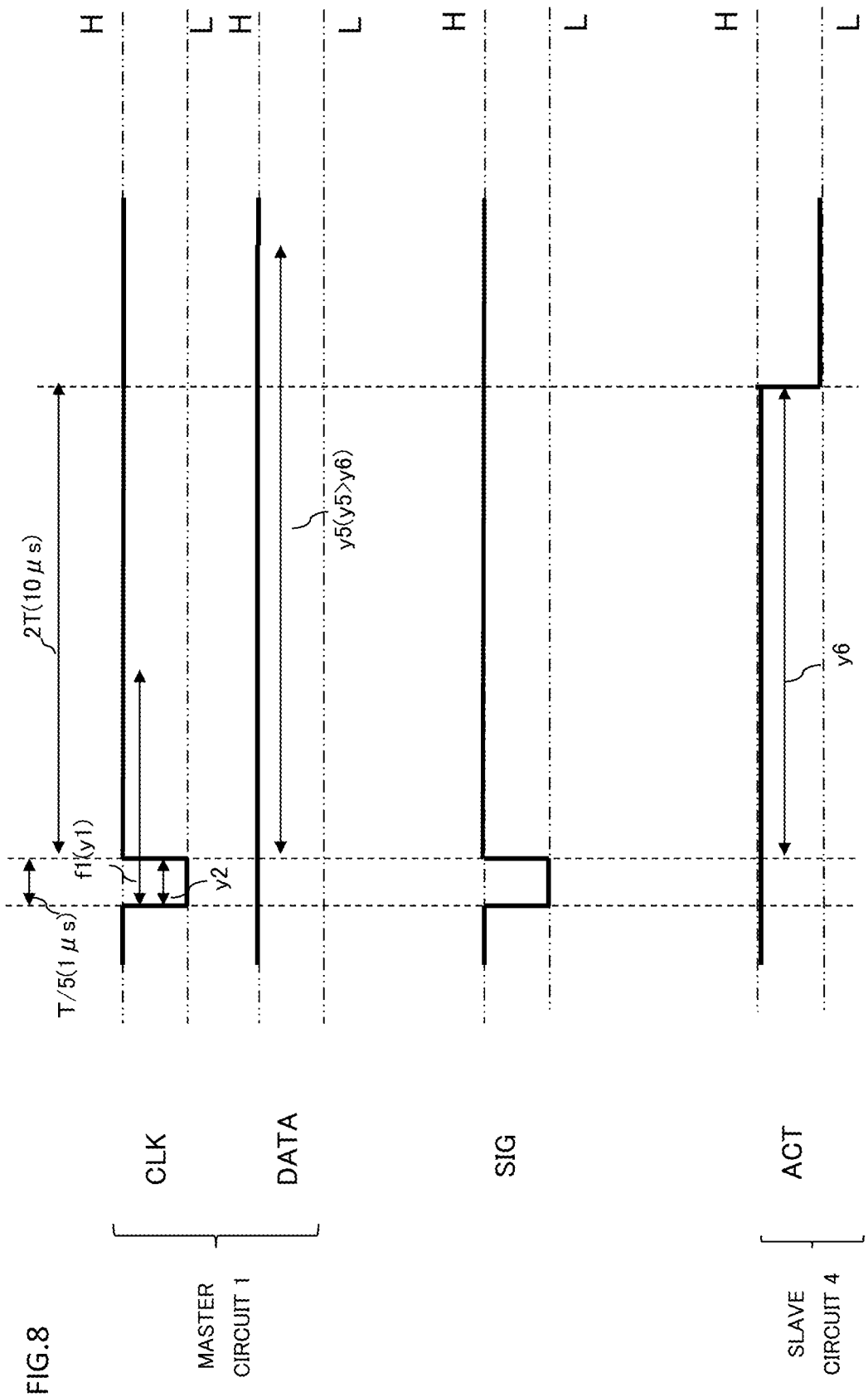
FIG. 8 A diagram showing a stop bit signal used in the single-line serial data transmission method of the present invention.

FIG. 8 shows a signal of the stop bit 65.

The clock CLK transmits low level L for only one fifth (T/5) of a cycle (T).

The data DATA stays at high level H for a time equal to or longer than two cycles (2T). Here, the time is set to be longer than the cycle T for distinction from high level H in the data DATA during a write (writing), which will be described later. With manufacturing variations in ICs taken into consideration, however, it is preferable that the time be set to be two cycles or longer. Accordingly, in this example, the time is set to be two cycles or longer.

The synthetic signal SIG has the waveform of the AND of the clock CLK and data DATA.

The control signal ACT turns to low level L when the synthetic signal SIG stays at high level H for a time equal to or longer than two cycles (2T), and this brings the slave circuit 4 into a non-data DATA accepting state. A response end transmission time y5 needs to be longer than a response end time y6. In this example, two cycles (2T) equal 10 μs (the response end time y6).

Figure 9:
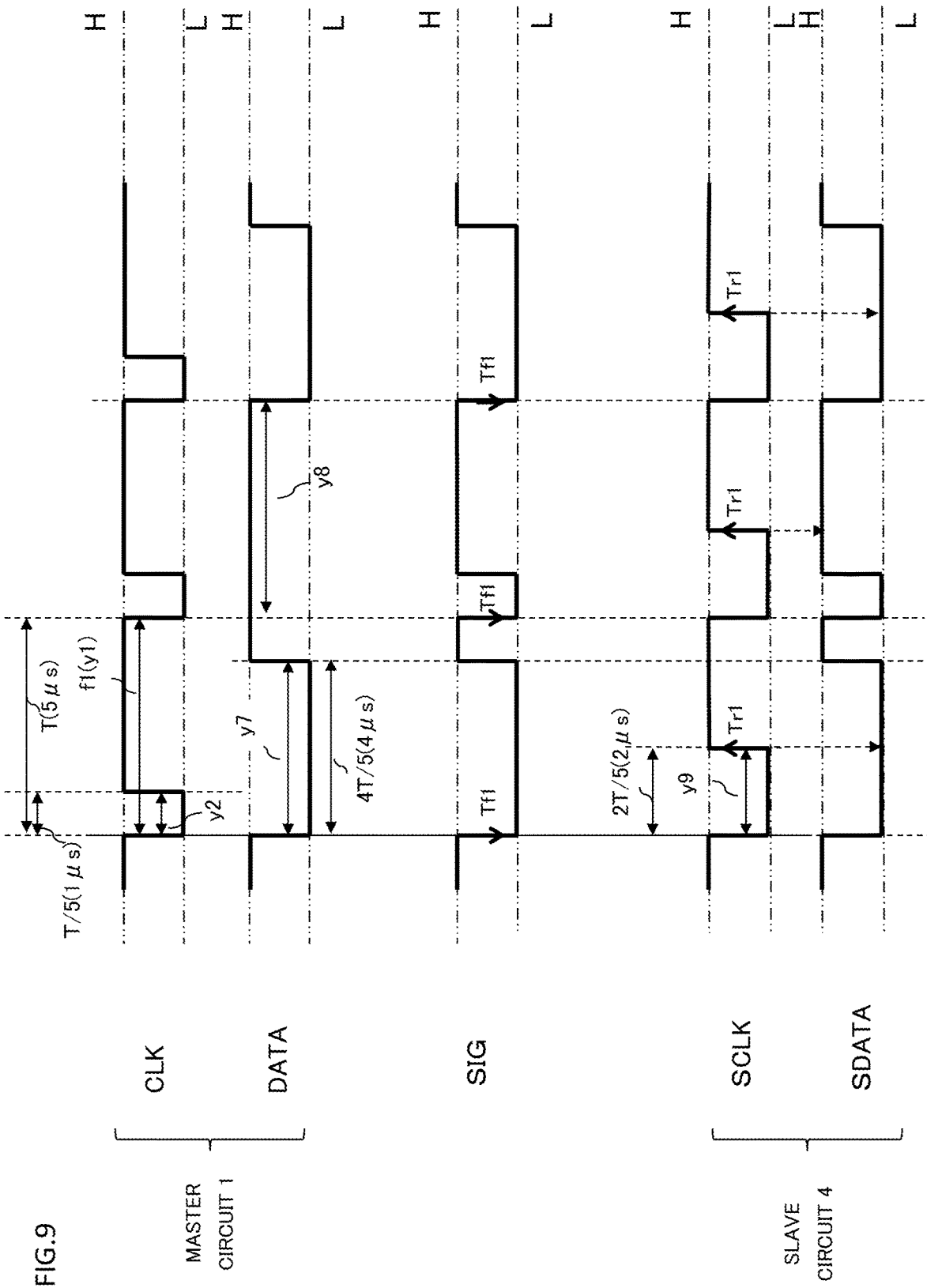
FIG. 9 A diagram showing a write signal (write) used in the single-line serial data transmission method of the present invention.

FIG. 9 shows the signals (clock CLK and data DATA) in the master circuit 1, the synthetic signal SIG, and the signals (slave clock SCLK and slave data SDATA) in the slave circuit 4, all as observed during a write (writing).

The clock CLK transmits low level L for only one fifth (T/5) of a cycle (T).

The data DATA, while at low level L, outputs low level L for about four fifths (4T/5) of a cycle (a data low time y7), and, while at high level H, outputs high level H for one cycle (T) (a data high time y8).

The synthetic signal SIG has the waveform of the AND of the clock CLK and data DATA.

The slave clock SCLK exhibits a waveform Tr1 which falls at the same time as the fall Tf1 of the synthetic signal SIG and rises about two fifths (2T/5) of a cycle thereafter (after a clock reception time y9 has passed).

The slave data SDATA is exactly the same as the synthetic signal SIG.

The slave circuit 4 reads the slave data SDATA at the rise Tr1 of the slave clock SCLK.

Figure 10:
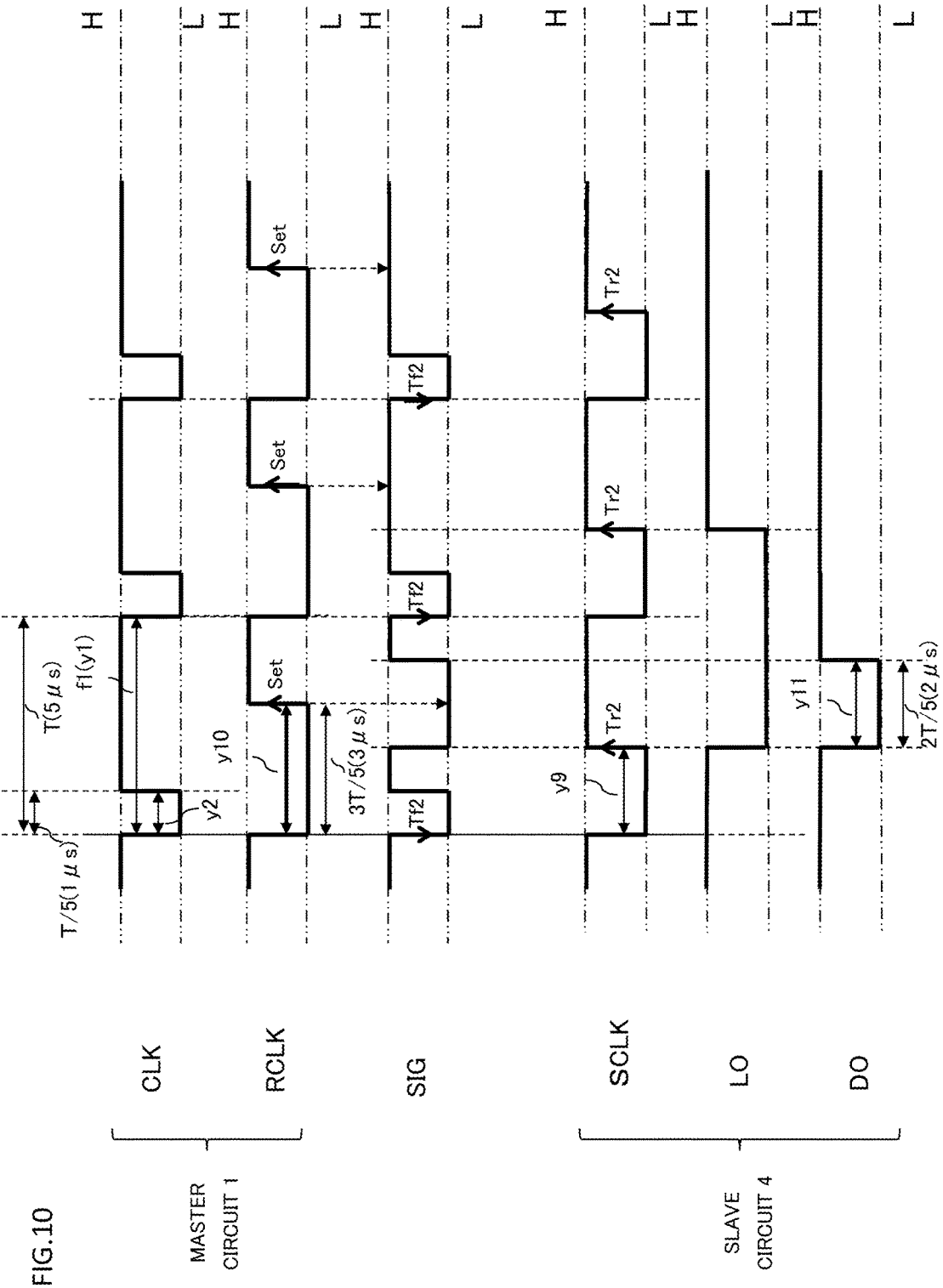
FIG. 10 A diagram showing a read signal (read) used in the single-line serial data transmission method of the present invention.

FIG. 10 shows the signals (clock CLK and read clock RCLK) in the master circuit 1, the synthetic signal SIG, and the signals (slave clock SCLK, logic out LO, and data out DO) in the slave circuit 4, all as observed during a read (reading).

The clock CLK transmits low level L for only one fifth (T/5) of a cycle (T).

The read clock RCLK falls at the same time as the fall of the clock CLK and reads the read data RDATA at the rise of the set terminal Set, that is, about three fifths (3T/5) of a cycle thereafter (after a read time y10 has passed).

As the synthetic signal SIG, the AND signal of the clock CLK from the master circuit 1 and the data out DO from the slave circuit 4 is transmitted.

The slave clock SCLK exhibits a waveform Tr2 which falls at the same time as the fall Tf2 of the synthetic signal SIG and rises about two fifths (2T/5) of a cycle thereafter (after a clock reception time y9 has passed).

The output of the logic out LO is determined at the rise of the slave clock SCLK.

The data out DO so operates that its logic level to be output is determined at the fall of the logic out LO and that it outputs that logic level for about two-fifths (2T/5) of a cycle (a data output time y11).

The invention has been described by way of an example where a cycle is divided into five periods, but this is not meant to be any limitation.

In this example, what happens in one cycle is divided into the following four events:

They include transmission of the clock CLK from the master circuit 1; generation of the slave clock SCLK in the slave circuit 4; generation of the read clock RCLK in the master circuit 1; and transmission of data DATA from the master circuit 1 (or transmission of data out DO from the slave circuit 4).

In addition to the above four events, returning to initial values constitutes another event, and so a total of five events is necessary in one cycle. This is the reason that the above description assumes division into five segments.

For example, if the read (reading) function is omitted, division into four segments is sufficient. Or, the number of division may be increased to, for example, six or seven.

Furthermore, while, in this invention, a cycle is divided into five equal periods for easy understanding, this is not meant to be any limitation in implementation. For example, the clock CLK pulse width y2 is set such that y2=cycle T/m (2≤m≤50). That is, generation of the clock CLK may be processed in a shorter or longer time than in the example, and the rest of the time may be used for other events. That is, in the case of the events during a write (writing), the clock pulse width y2, the clock reception time y9, the data low time y7, and the data high time y8 can maintain the relationship of y2<y9<y7 (or y8). Maintaining such a magnitude relationship permits the clock signal and the data signal to be processed properly.

While the present invention has been described on the assumption that all signals are high initially, needless to say, the same results can be achieved with all the signals reversed so that they are low initially.

As described above, it is possible to configure a high-speed single-line serial data transmission circuit with a very simple circuit configuration.

INDUSTRIAL APPLICABILITY

This invention is to provide a single-line serial transmission circuit, and a transmission method for use in it, that can greatly contribute to space saving, which is sought in recent years. Thus, the present invention finds extremely wide industrial application.

LIST OF REFERENCE SIGNS 1 master circuit
2 data clock adder
3 data receiver
4 slave circuit
5 active generator
6 data clock separator
7 data transmitter
8 signal line
9 logic
10 overcurrent protection function
11 overvoltage protection function
12 output ground short protection function
13 temperature protection function
14 switching regulator
15 driver logic
16 error amplifier
17 PWM comparator
18 oscillator
19 reference voltage source
61 start bit
62 read/write
63 address
64 data
65 stop bit
ACT control signal
AND11, AND21, AND22, AND31 to AND33 AND circuit
BUF11, BUF21 to BUF23, BUF31, BUF32 buffer circuit
C1, C2, C21 to C23, C31, C32 capacitor
CC21 to CC23 current source
CLK clock
CG11 clock generation circuit
COMP phase compensation terminal
DATA data
DGND ground potential
DFF21, DFF22, DFF31 D flip-flop circuit
DO data out
f1 transmission frequency
FB feedback terminal
H high level
INV11, INV21 to INV24, INV31 to INV39, INV91 inverter circuit
L low level
L1 coil
LC11 to LC14 delay circuit
LO logic out
M21 to M23, M31 to M34, M91 MOS transistor
N1 NMOS transistor
NAND21 NAND circuit
OCP overcurrent protection function
OVP overvoltage protection function
OR31 OR circuit
P1 PMOS transistor
PGND ground terminal
Q output terminal
R1, R2, R3, R31, R32 resistor
RCLK read clock
RDATA read data
Reset reset terminal
RSFF11 RS flip-flop circuit
SCLK slave clock
SCP output ground short protection function
SDATA slave data
Set set terminal
SIG synthetic signal
SMT31 Schmitt inverter circuit
SW switching terminal
T cycle
Tact control terminal
Tlo logic out terminal Tms master signal terminal
Tsc slave clock terminal
Tsd slave data terminal
TSD temperature protection function
Tsig signal terminal
VIN power terminal
Vin power source
VREG3D supply power potential
X1, X2, X3 response wait time
Y response start time
y1 one cycle time
y2 clock transmission time (clock pulse width)
y3 response start transmission time
y4 response start time
y5 response end transmission time
y6 response end time
y7 data low time
y8 data high time
y9 clock reception time
y10 data output time
y11 read time
Z response end time

The invention claimed is:

1. A single-line serial transmission circuit comprising a master circuit and a slave circuit, wherein
the master circuit includes:
a data clock adder used in writing transmission data from the master circuit to the slave circuit, and
a data receiver used in writing reception data from the slave circuit to the master circuit,
the slave circuit includes:
a signal terminal configured to receive from the master circuit a synthetic signal for transmitting the transmission data,
an active generator configured to generate a control signal on the basis of the synthetic signal,
a data clock generator configured to generate a slave clock signal on the basis of the synthetic signal used in writing the transmission data from the master circuit to the slave circuit,
a slave data terminal configured to output the transmission data on the basis of the synthetic signal, and
a data transmitter used in writing the reception data from the slave circuit to the master circuit,
wherein the master circuit and the slave circuit are connected together via a single signal line through which the synthetic signal is transmitted to the signal terminal from the master circuit.

2. The single-line serial transmission circuit according to claim 1, wherein during a write of the transmission data from the master circuit to the slave circuit,
in the master circuit, the synthetic signal synthesized from a clock signal and a data signal by the data clock adder is transmitted to the slave circuit via the signal line, and
in the slave circuit, the synthetic signal transmitted via the signal line is passed through a delay circuit to the data clock generator to generate the slave clock signal.

3. The single-line serial transmission circuit according to claim 1, wherein during a write of the reception data from the slave circuit to the master circuit,
a logic out signal from a logic in the slave circuit is passed through a delay circuit and the data transmitter and is transmitted via the signal line to the master circuit, and
in the master circuit, transmission data transmitted from the signal line is passed through the data receiver to extract a read data signal.

4. The single-line serial transmission circuit according to claim 1, wherein the slave circuit further includes:
a control terminal configured to output the control signal by which the slave circuit is brought into a data accepting state,
a slave clock terminal configured to output the slave clock signal, and
wherein the slave clock signal is fed to the slave clock terminal, and
the control signal is fed to the control terminal.

5. The single-line serial transmission circuit according to claim 4, wherein in the slave circuit,
the slave clock signal generated from the input to the signal terminal via a D flip-flop is fed to the slave clock terminal, and
the control signal generated from the input to the signal terminal via a delay circuit and the D flip-flop is fed to the control terminal.

6. The single-line serial transmission circuit according to claim 5, wherein to delay the input to the signal terminal, the delay circuit charges a capacitor with a current source, and discharges the capacitor with a MOS transistor.

7. The single-line serial transmission circuit according to claim 6, wherein
the delay circuit is composed of a charging/discharging circuit including a resistor and a capacitor, and
a delay time is determined by a resistance value of the resistor and a capacitance value of the capacitor.

8. The single-line serial transmission circuit according to claim 4, wherein in the slave circuit,
the slave clock signal generated from the input to the signal terminal via a D flip-flop is fed to the slave clock terminal, and
the control signal generated from the input to the signal terminal via a delay circuit is fed to the control terminal.

9. The single-line serial transmission circuit according to claim 1, wherein the slave circuit responds to the signal line upon receiving a request of a read (reading) from the master circuit to the slave circuit.

10. The single-line serial transmission circuit according to claim 1, wherein the slave circuit includes a switching power supply circuit.

11. The single-line serial transmission circuit according to claim 10, wherein the switching power supply circuit has at least one of an overcurrent protection function, an overvoltage protection function, an output ground short protection function, and a temperature protection.

12. A single-line serial transmission circuit comprising a master circuit and a slave circuit, wherein
the master circuit includes:
a data clock adder used in writing transmission data from the master circuit to the slave circuit, and
a data receiver used in writing reception data from the slave circuit to the master circuit,
the slave circuit includes:
a data clock separator used in writing the transmission data from the master circuit to the slave circuit,
a data transmitter used in writing the reception data from the slave circuit to the master circuit, and
an active generator, and
the master circuit and the slave circuit are connected together via a single signal line,
wherein the slave circuit further includes:
a signal terminal via which a synthetic signal synthesized from a clock signal and a data signal by the data clock adder is received, wherein a control terminal via which the slave circuit is brought into a data accepting state,
a slave clock terminal, and
a slave data terminal, and
an input to the signal terminal is fed as the data signal to the slave data terminal,
the clock signal generated from the input to the signal terminal is fed to the slave clock terminal, and
a control signal generated from the input to the signal terminal is fed to the control terminal,
wherein in the slave circuit,
the input to the signal terminal is fed as the data signal to the slave data terminal,
the clock signal generated from the input to the signal terminal via a D flip-flop is fed to the slave clock terminal, and
the control signal generated from the input to the signal terminal via a delay circuit is fed to the control terminal,
wherein
generation of the clock signal becomes possible when the control signal turns to high level, and
the control signal stabilizes the control signal itself on having turned to high level or low level.

13. The single-line serial transmission circuit according to claim 12, wherein the control signal generated from the input to the signal terminal is fed to the control terminal further via the D flip-flop.

14. A transmission method for a single-line serial transmission circuit comprising a master circuit and a slave circuit, wherein
the master circuit includes:
a data clock adder used in writing transmission data from the master circuit to the slave circuit, and
a data receiver used in writing reception data from the slave circuit to the master circuit,
the slave circuit includes:
a data clock separator used in writing the transmission data from the master circuit to the slave circuit,
a data transmitter used in writing the reception data from the slave circuit to the master circuit, and
an active generator, and
the master circuit and the slave circuit are connected together via a single signal line, wherein
communication starts at a fall of a synthetic signal synthesized from a clock signal and a data signal by the data clock adder,
when the synthetic signal stays at low level for a predetermined time, a control signal generated from the synthetic signal turns to high level to bring the slave circuit into an accepting state,
a slave clock is extracted a predetermined time after the fall of the synthetic signal,
data is read at a rise of the slave clock, and
when the synthetic signal stays at high level for a predetermined time, the control signal turns to low level to bring the slave circuit into a non-accepting state, thereby ending communication.

15. The single-line serial transmission method according to claim 14, wherein the synthetic signal includes a start bit at a head, followed by a read (reading) and a write (writing), an address, data, and a stop bit at a tail.

16. The single-line serial transmission method according to claim 14, wherein
at a start of communication, an AND of the clock signal and the data signal is transmitted as the synthetic signal from the master circuit, and
when the synthetic signal stays at low level for a cycle T of the clock signal or longer, the control signal of the slave circuit turns to high level, thereby bringing the slave circuit into an accepting state.

17. The single-line serial transmission method according to claim 16, wherein
a pulse width y2 of the clock signal is set such that y2=T/m (the cycle T divided by m; 2≤m≤50), and
an other event is processed during part of a time of one cycle excluding the pulse width.

18. The single-line serial transmission method according to claim 16, wherein
during a write (writing), an AND of the clock signal and the data signal is transmitted as the synthetic signal from the master circuit,
the slave circuit drops a slave clock at a fall of the synthetic signal and then generates a signal which rises T/m (the cycle T of the clock signal divided by m) thereafter, and
at a rise of the slave clock, slave data is determined.

19. The single-line serial transmission method according to claim 16, wherein
during a read (reading), the clock signal alone is transmitted as the synthetic signal from the master circuit,
the slave circuit drops a slave clock at a fall of the clock signal and then generates a signal which rises T/m (the cycle T of the clock signal divided by m) thereafter,
at a rise of the slave clock, a logic out is determined,
at a rise of the slave clock, a data out is determined, and
at a rise of a read clock in the master circuit, a signal is read.

20. The single-line serial transmission method according to claim 16, wherein
at an end of communication, an AND of the clock signal and the data signal is transmitted as the synthetic signal from the master circuit, and
when the synthetic signal stays at high level for a cycle T of the clock signal or longer, the control signal of the slave circuit turns to low level, thereby bringing the slave circuit into a non-accepting state.

21. A slave circuit in communication with a master circuit by means of a single-line serial transmission, the slave circuit comprising:
a signal terminal configured to receive from the master circuit a synthetic signal for transmitting a transmission data,
an active generator configured to generate a control signal on the basis of the synthetic signal,
a data clock generator configured to generate a slave clock signal on the basis of the synthetic signal used in writing the transmission data from the master circuit to the slave circuit,
a slave data terminal configured to output the transmission data on the basis of the synthetic signal, and
a data transmitter used in writing the reception data from the slave circuit to the master circuit,
wherein the master circuit and the slave circuit are connected together via a single signal line through which the synthetic signal is transmitted to the signal terminal from the master circuit.

* * * * *